United States Patent [19]

Taguchi et al.

[11] Patent Number: 4,931,888
[45] Date of Patent: Jun. 5, 1990

[54] TRACKING SERVO CONTROL FOR DISC DRIVE

[75] Inventors: Keiich Taguchi; Kaoru Yanamoto, both of Kanagawa, Japan

[73] Assignee: Sony Corporation, Tokyo, Japan

[21] Appl. No.: 263,407

[22] Filed: Oct. 27, 1988

[30] Foreign Application Priority Data

Oct. 31, 1987 [JP] Japan .................. 62-276877

[51] Int. Cl.$^5$ ........................... G11B 5/596
[52] U.S. Cl. ............................. 360/77.04
[58] Field of Search ............. 360/77.02, 77.04, 77.08, 360/77.11

[56] References Cited

U.S. PATENT DOCUMENTS

| | | | |
|---|---|---|---|
| 4,412,165 | 10/1983 | Case et al. | 360/77.04 |
| 4,536,809 | 9/1985 | Sidman | 360/77.04 |
| 4,594,622 | 6/1986 | Wallis | 360/77.04 |
| 4,788,608 | 11/1988 | Tsujisawa | 360/77.04 |

FOREIGN PATENT DOCUMENTS 0130248 1/1985 European Pat. Off. .

*Primary Examiner*—Alan Faber
*Assistant Examiner*—David L. Robertson
*Attorney, Agent, or Firm*—Hill, Van Santen, Steadman & Simpson

[57] ABSTRACT

A tracking servo for a floppy disc drive or the like employs a plurality of servo tracks recorded between adjacent data tracks on the floppy discs, with the signals from adjacent servo tracks on both sides of a data track being used to define the difference between the position of the magnetic head and the center line of the data track being accessed, and an adder is used to add the current position of the head to the product of such difference multiplied by a constant, with the sum delayed by the period of one rotation for comparison with the current position of the head, to derive a tracking control signal.

6 Claims, 5 Drawing Sheets

TRACKING SERVO CONTROL FOR DISC DRIVE

BACKGROUND OF THE INVENTION

This invention relates to a tracking servo control apparatus for a disc drive system, and more particularly to a tracking control apparatus for a disc drive system in which a tracking servo signal is provided on a disc and fine tracking servo control is accomplished in accordance with the reproduced tracking servo signal.

Recently recording density, and especially track density, measured in units of TPI (tracks per inch), has become a very important factor in the field of the disc memory systems. To obtain higher track densities, more precise tracking systems are required. One solution to this tracking system problem has been the use of a tracking servo signal which is prerecorded on a disc. During operation, and in accordance with the reproduced servo signal, a closed loop tracking servo circuit controls the position of a head. This tracking servo technique is called a fine tracking servo control, while a coarse tracking servo accomplishes only a rough positioning of the head with the mechanical precision of an actuator. The coarse tracking servo control uses an open loop servo circuit. Generally, a combination of the fine and coarse tracking servo controls has been used for tracking control of the head in disc memory systems if they need a precise tracking control.

However, the above explained tracking control has several problems, especially when floppy discs are used as a disc medium. Since the floppy discs are interchangeable on a disc drive, some eccentricity of tracks cannot be avoided. The amount of the eccentricity changes in accordance with the condition of disc chucking onto the disc drive. Some expansion, contraction and deformation of the disc because of a change of temperature or humidity are also inherent characteristics of the floppy discs.

Accordingly, the positions of actual tracks on the disc are different from the positions of ideal tracks. Thus, it is very hard to make the head follow the actual tracks by using tracking error data when the prerecorded tracking signal is reproduced from the disc, because the amount and the direction of the track deviation from the ideal tracks is very large.

SUMMARY OF THE INVENTION

An object of the invention is to provide a precise tracking servo system for a disc drive system which overcomes the above described problems of the prior art disc drive system.

Another object of the invention is to provide a precise tracking servo system for a floppy disc drive system using a servo signal prerecorded on servo sectors on a floppy disc regardless of an expansion, contraction or deformation thereof caused by a change of temperature or humidity, and regardless of an eccentricity of tracks on the floppy disc caused by various conditions of chucking of the floppy disc onto the disc drive.

In accordance with one aspect of this invention, a disc drive is provided which includes at least one head, at least one disc medium having a servo signal recorded thereon, a head position detector for detecting the position of the head, a tracking error detector for detecting tracking error of the head with respect to the position of a desired track, an adder for adding outputs of the head position detector and the tracking error detector, a delay circuit for delaying an output of the adder for at least one rotation period of the disc, a comparator for comparing the output of the head position detector with the output of the delay circuit, and a control circuit for controlling the head position in accordance with an output of the comparator.

In the above system, the current tracking servo control is based on previous tracking error data developed in a previous cycle of the disc rotation, and precise tracking servo control for the disc drive is possible regardless of a relatively large amount of eccentricity of the tracks, or expansion or contraction of the disc.

DETAILED DESCRIPTION OF THE PREFERRED EMBODIMENT OF THE INVENTION

Figure 1:
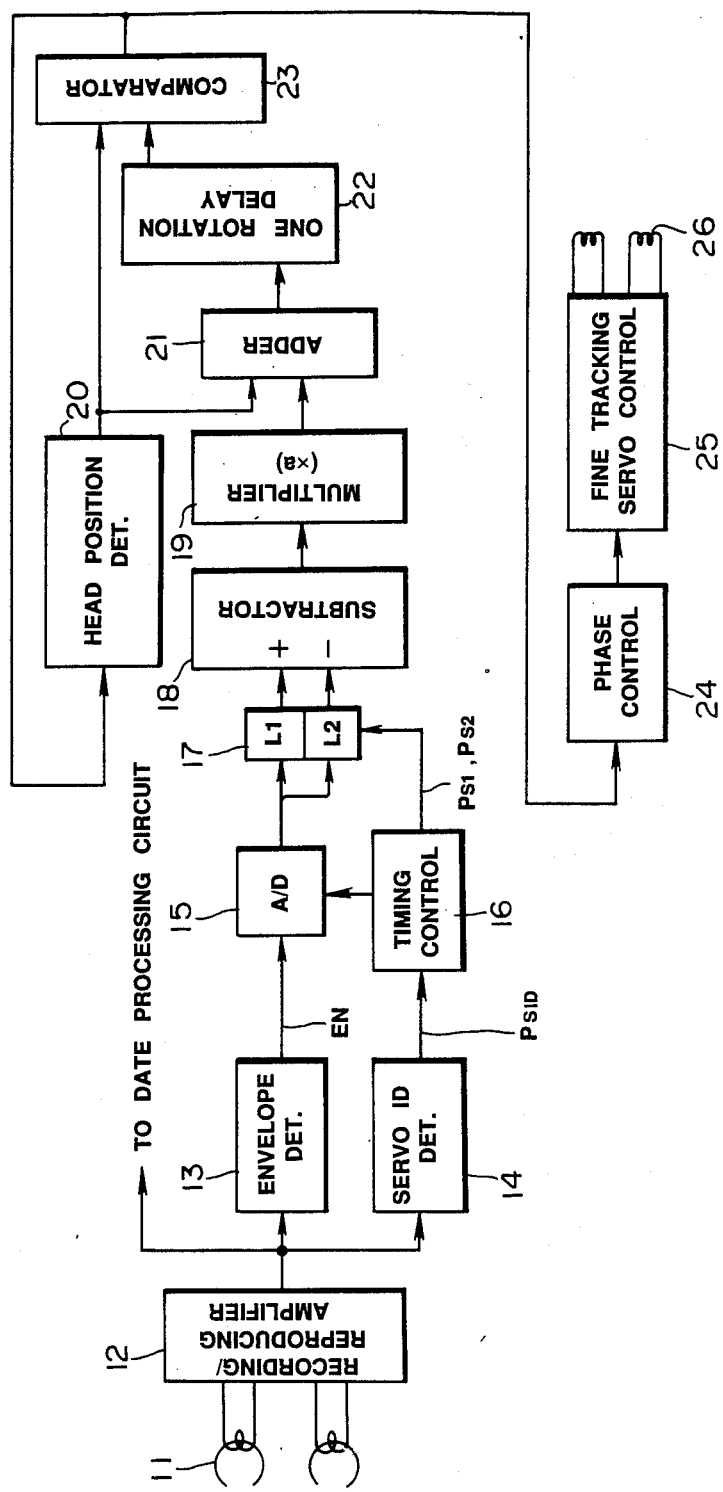
FIG. 1 is a block diagram of one embodiment of a tracking control system for a disc drive according to the invention.
Figure 7:
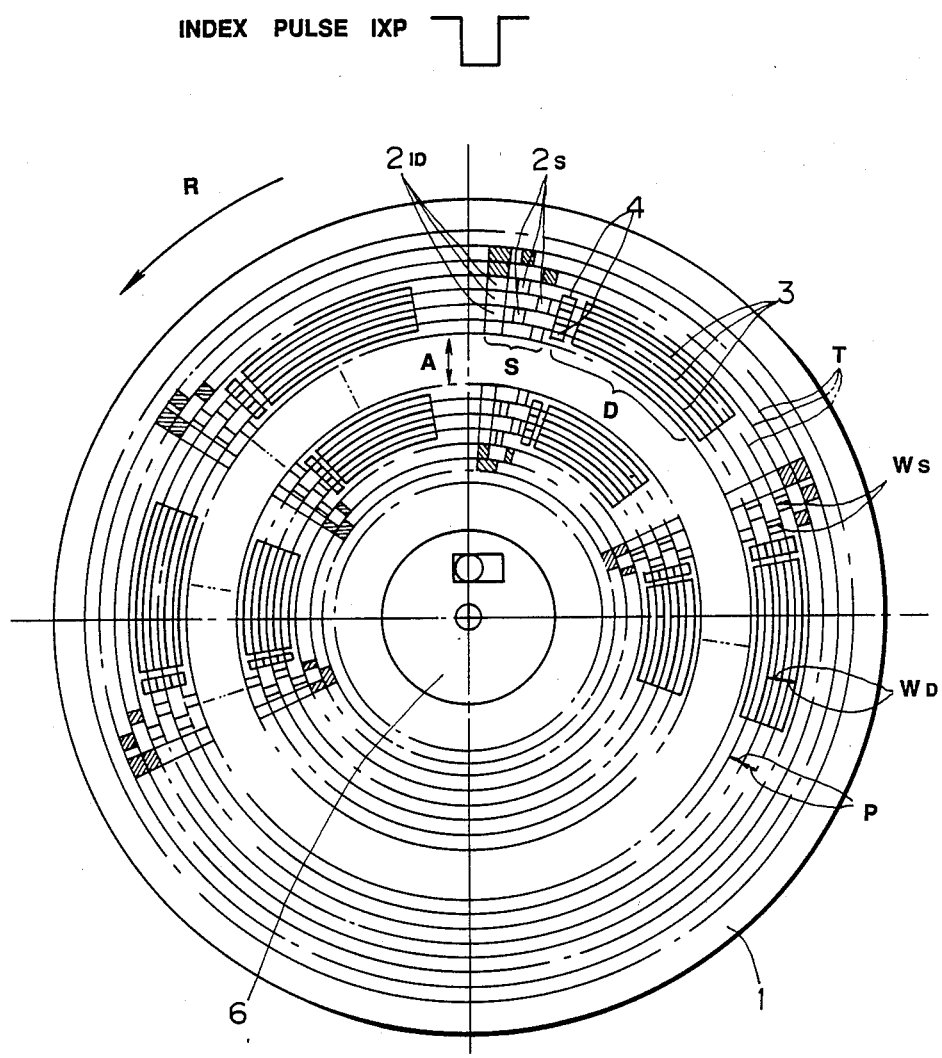
FIG. 7 shows a plan view of an example of a recording format of a magnetic disc.

Referring first to FIG. 1, a block diagram of a tracking control apparatus according to the present invention is shown. In this embodiment, the invention is applied to a floppy disc system which utilizes a recording format, for example, as shown in FIG. 7.

Servo sectors S and data sectors D are intermittently provided on concentric tracks of the floppy disc. In servo sectors S, servo signals 2 are prerecorded and in data sectors D, data signals 3 are recorded or reproduced. Each servo signal 2 is prerecorded so that the center line of servo signal 2 is offset from that of a data signal 3 by half of a track pitch. At the beginning portion of each servo sector S, a servo ID signal 2ID is prerecorded to identify a servo sector 2. Following servo ID signal 2ID, two kinds of servo burst signal 2S are prerecorded.

Figure 2:
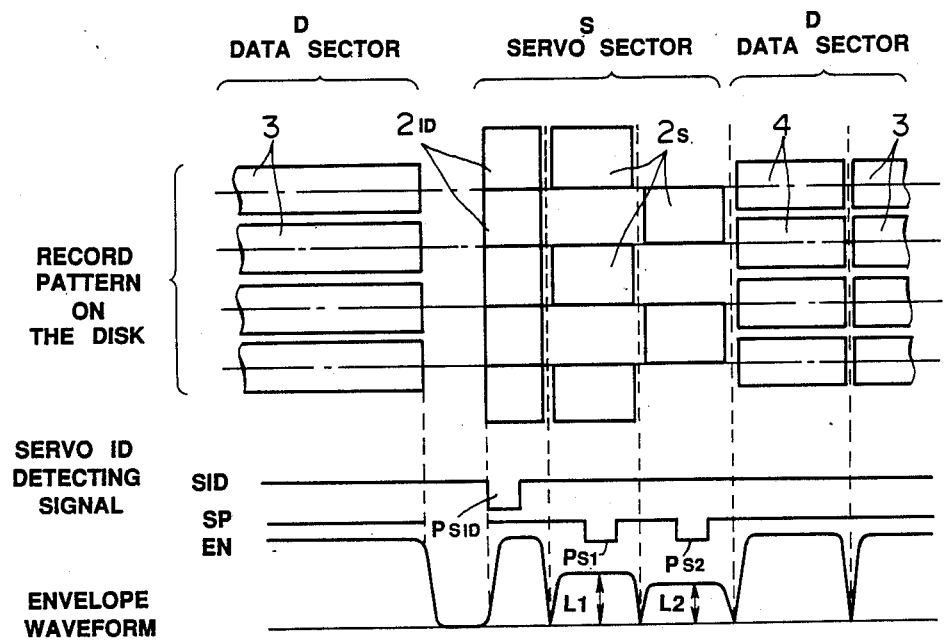
FIG. 2 is a drawing showing a plan view of a portion of the disc, and waveforms of signals developed when the head scans such portions, for explaining the detecting operation of a servo signal recorded on a disc.

FIG. 2 is an enlarged illustration of the recording format. Although tracks on a disc are actually concentric, FIG. 2 shows the tracks as if they were straight lines for explanation purposes. As shown in FIG. 2, servo ID signals 2ID and the servo burst signals 2S are formed in the servo sector S, and data signal track 3 and data sector ID signal 4 are formed in data sector D on the disc. These patterns are repeatedly formed on the disc as shown in FIG. 7.

When the head scans data track D, it may also scan a portion of a pair of servo signals 2S at the same time. The tracking position information is available by comparing the envelope levels of the reproduced pair of servo signals. As shown in FIG. 1, signals reproduced by magnetic head 11 are amplified and filtered by recording/reproducing amplifier 12 and then supplied to envelope detecting circuit 13 and servo ID detecting circuit 14. The sample output signal of the envelope detecting circuit 13 is shown in FIG. 2 on line EN. This signal is expressed as envelope waveform EN, and is generated when the magnetic head 11 is passing over the servo sector S. A pulse signal PSID at the output of the servo ID detecting circuit 14 is generated (FIG. 2, line SID) when the detecting circuit 14 detects a servo ID signal 2ID, and then the pulse signal PSID is supplied to a timing control circuit 16. Derived from the timing of the pulse signal PSID as shown in FIG. 2, the timing control circuit 16 then supplies sampling pulses PSI and PS2 (FIG. 2, line SP) to an A/D converter 15 and a latching circuit 17. In response to sampling pulses PSI and PS2, the levels of envelope waveform EN corresponding to servo burst signal 2S are latched by the latching circuit 17. As can be seen in FIG. 2, L1 and L2 show the envelope level of servo burst signal 2S oppositely offset from the center line of data signal track 3 and the latched levels L1 and L2 are supplied to a subtractor 18 and are subtracted from each other. Then tracking error data L1-L2 is calculated and supplied to a multiplier 19 which provides its result to an adder 21. In the mulitplier 19, the tracking error data L1-L2 is multiplied by a number a which is selected between 0 and 1. The output signal of a head position detecting circuit 20 Hpd is also supplied to the adder 21. Then, the output signal a(L1-L2)+Hpd of the adder 21 is delayed by a delay circuit 22 whose delay is as long as the rotation period of the disc. Since servo sectors S may be provided for every data sector D and the output signal of adder 21 is updated after reading each sector. A shift register may be used having a number of stages such that the number of shifting operations required to pass data through the shift register is as same as the number of the sectors during each rotation of the disc. A FIFO (first-in, first-out) memory may be used as a part of delay circuit 22.

At this point, a comparator 23 compares the output signal of head position detecting circuit 20 Hpd with the delayed output signal of the adder 21. The output signal of the comparator 23 is supplied to a phase control circuit 24 which makes a phase correction of the supplied signal. Then the output signal of the phase control circuit is supplied to a fine tracking control circuit 25. The fine tracking servo control circuit 25 controls an actuator 26 which may be a stepping motor, a linear motor, etc. so that magnetic head 11 is positioned in alignment with the center line of data signal track 3.

Hereinafter, more detail of the operation of the above described system will be explained.

Figure 3:
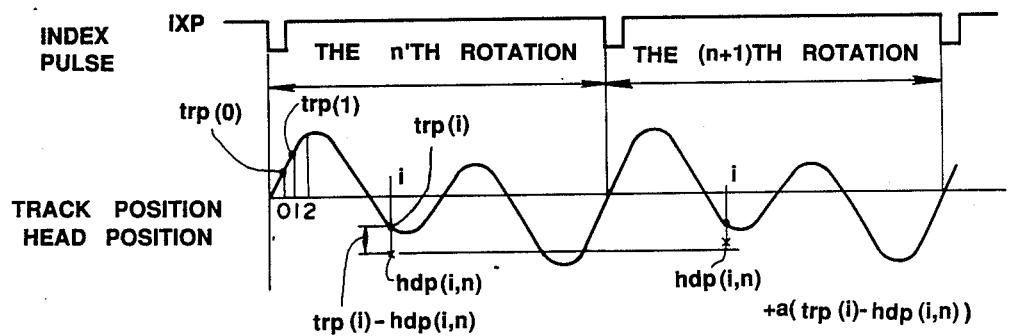
FIG. 3 is a drawing for explaining a basic principle of the tracking control for a disc drive.

The basic principle of the operation of the invention is that the present tracking error data is used for the head position controlling after at least one rotation of the disc. In other words, the head position control can be done with the previous tracking error data which was calculated at least one prior disc rotation. FIG. 3 shows the index pulse IXP which is generated once every rotation of the disc and also the change of the track position which is caused by eccentricity or deformation of the disc itself. More particularly, the change of the track position as shown in FIG. 3 means the change in the radial position of the center line of actual tracks with respect to the center line of ideal tracks, while the disc rotates. It is also assumed that such a change of track position is related only to the angular position of the rotating disc. Accordingly, it is also assumed that characteristics of the change are stable in the nth rotation and in the (n+1)th rotation. On the other hand, the difference between the position of the magnetic head 11 and the actual track, that is, the tracking error, is detected every sector. The tracking error data in the ith sector during the nth rotation is shown as trp(i)Hpd(i,n), trp(i) being the actual track position and the Hpd(i,n) being the position of magnetic head 11 in the ith sector during the nth rotation with respect to the center line of the ideal tracks. Using the tracking error data obtained in the ith sector of the nth rotation, the magnetic head position Hpd(i,n+1) in the ith sector during the (n+1)th rotation is controlled. The relationship between Hpd(i,n+1) and Hpd(i,n) is as follows.

$$Hpd(i,n+1) = Hpd(i,n) + a[trp(i) - Hpd(i,n)] \quad \{1\}$$

where $0 < a \leq 1$

Although the left side of equation {1} represents the desired head position to which magnetic head 11 will be positioned, it may be considered as the actual position of the magnetic head 11, if the operational characteristics of the fine tracking servo control circuit 25 and the actuator 26 are substantially fast and linear.

If (a) is 1, Hpd(i,n+1) has no tracking error any more. However, in actual practice, a number of rotations of the disc may be required to obtain final accurate placement of the magnetic head 11. The circuit of this invention is designed to only perform a partial correction (a) during each rotation, to avoid overshooting or a hysteresis effect. Equation {1} can be rewritten to incorporate multiplier 19's junction as follows.

$$\begin{aligned}
Hpd(i,n+1) &= (1-a)Hpd(i,n) + a \cdot trp(i) \quad &\{2\} \\
&= (1-a)^2 Hpd(i,n-1) + a[1 + (1-a)]trp(i) \\
&= (1-a)^3 Hpd(i,n-2) + a[1 + (1-a) + (1-a)^2]trp(i) \\
&= (1-a)^{n+1} Hpd(i,o) + a[1 + (1-a) + (1-a)^2 + \ldots + (1-a)^n]trp(i)
\end{aligned}$$

If $n \to \infty$ \quad \{3\}

$$\begin{aligned}
Hpd(i,\infty) &= a \frac{1}{1-(1-a)} trp(i) \\
&= trp(i)
\end{aligned}$$

because $0 < a \leq 1$

Therefore, if (a) is between 0 and 1, the fine tracking servo operation of magnetic head 11 according to equation {1} finally controls the magnetic head position Hpd in alignment with the track position trp. In equation {1}, the first term of the right side represents the magnetic head position one rotation period ago and the second term represents the tracking error one rotation period ago. The magnetic head position Hpd(i,n) in the ith sector during the nth rotation is also provided from the following equation.

$$Hpd(i,n)=Hpd(i,n-1)+a[trp(i)-Hpd(i,n-1)] \quad (5)$$

The following is an explanation of this system when the magnetic head 11 is running on the ith sector during the nth rotation. The tracking error data a(L1-L2) derived from the multiplier 19 in FIG. 1 corresponds to a [trp(i)−Hpd(i,n)] as above. Since the magnetic head position detecting circuit 20 supplies the current position data Hpd(i,n) of the magnetic head 11 to adder 21, the adder 21 provides Hpd(i,n)+a[trp(i)−Hpd(i,n)], representing the position data Hpd(i,n+1), to which position magnetic head 11 will be moved in the ith sector during the (n+1)th rotation. At the same time the output of the delay circuit 22 provides Hpd(i+1,n−1) +a[trp(i+1)−Hpd(i+1,n−1)] as the position data Hpd(i+1, n), to which position magnetic head 11 will be moved in the (i+1)th sector during the nth rotation of the disc. Accordingly, when the magnetic head 11 reaches the (i+1)th sector, the data Hpd(i+1,n) - Hpd(i,n), which corresponds to the difference between the current position Hpd(i,n) of magnetic head 11 and the next position Hpd(i+1,n), is supplied from comparator 23 to the phase control circuit 24 and then supplied to fine tracking servo control circuit 25 so that the magnetic head 11 is positioned on the desired track in the (i+1)th sector.

The current position of the magnetic head 11 is provided by cummulating the moving distance of magnetic head 11 with the consideration of the moving direction.

When the tracking control is initiated and no tracking error data is yet stored, usual tracking techniques may be used, for example, the fine tracking control may be done according to the tracking error data based on the reproduced servo signal on the disc, without storing or delaying the tracking error data. Once the tracking error data comes within a predetermined range, the tracking error data is stored or delayed and used for the head positioning during the next rotation of the disc. In this case, although the tracking control of this embodiment starts after one rotation of the disc, the tracking control is done according to the tracking error, without waiting such a one rotation delay.

Figure 4A:
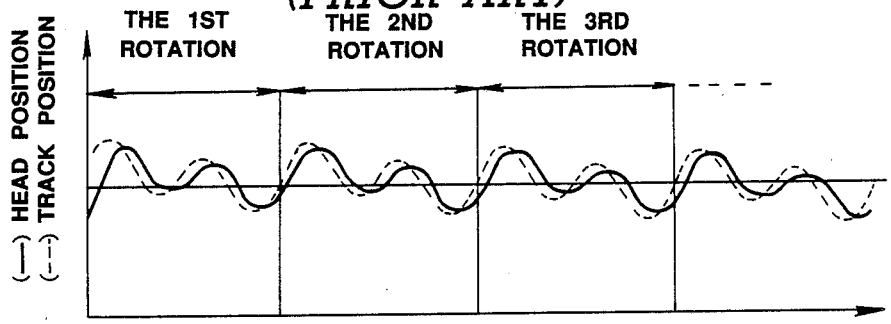
FIG. 4(A) shows the relationship between a track position and a head position according to the prior art tracking control.
Figure 4B:
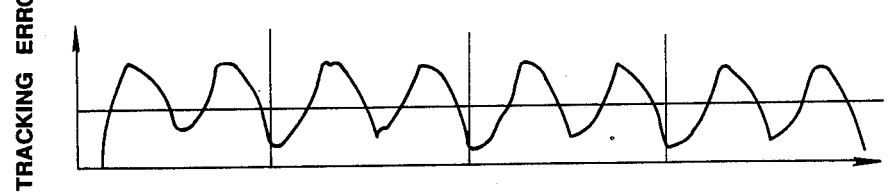
FIG. 4(B) shows a waveform of tracking error according to the prior art tracking control.

An advantage of the invention is shown in FIG. 4. Referring to FIG. 4(A), which relates to prior art apparatus, the relationship between the track position and the magnetic head position is shown. Referring to FIG. 4(B), the amount of the tracking error encountered with such prior art apparatus is shown.

Figure 5A:
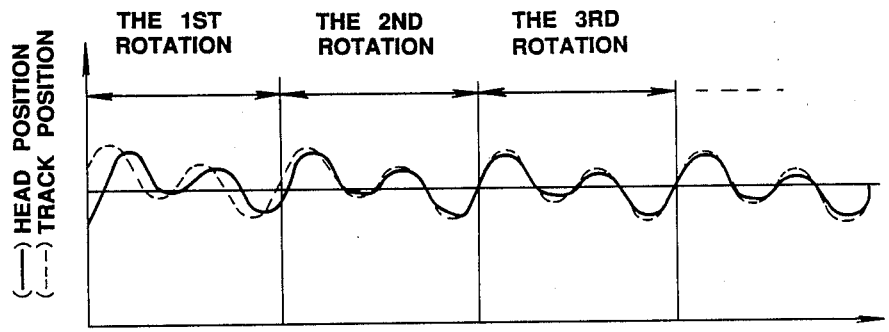
FIG. 5(A) shows a relationship between a track position and a head position according to the invention.
Figure 5B:
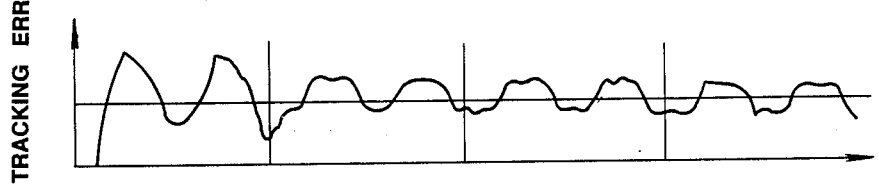
FIG. 5(B) shows a waveform of tracking error according to the invention.

On the other hand, FIG. 5(A) and 5(B) respectively show the same data according to the tracking control of our invention. In FIG. 4(A) and 5(A), a broken line shows the changing of the actual track position on the disc with respect to the ideal track position which has no eccentricity, and a solid line shows the position of the magnetic head which is tracking-servo-controlled.

Comparison of FIG. 4(A), 4(B) and 5(A), 5(B) shows that the tracking ability of the magnetic head in FIG. 4 begins with an imperfect position, and the amount of the tracking error is never improved after rotations of the disc; but that the tracking ability of the magnetic head in FIG. 5 is significantly improved after the second rotation and consequently the tracking error is also significantly reduced.

Figure 6:
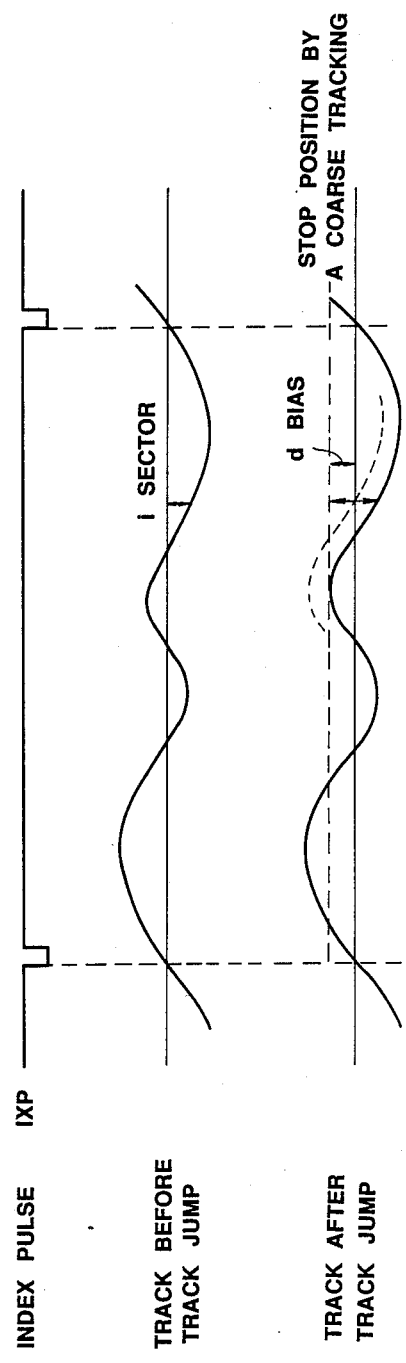
FIG. 6 is a drawing for explaining a tracking control operation during a track jump.

In the above explanation, it is assumed for easier explanation that the magnetic head is scanning the same track continuously, however, the characteristic of the deviation of any actual track from the corresponding ideal track over various radial positions is very similar if the angular positions are the same. Accordingly, when a changing of the selected track happens, that is, a track jump happens, the tracking error data of the different tracks may be used. In this case, as shown in FIG. 6, the difference d of the head positions in the ith sector before and after the track jump corresponds to the positioning error caused by the coarse tracking apparatus during the track jump, and the settling time of the tracking servo during the track jump can be shortened by adding the difference d as a biasing factor for other following sectors.

This invention should is not limited to the above embodiment but can be also applied to a hard magnetic disc system, an optical disc system or a magnetic-optical disc system as well as a flexible magnetic disc. Many variations which utilize the invention are also possible.

It will be apparent that various modifications and/or additions may be made in the apparatus of the invention without departing from the essential feature of novelty involved, which are intended to be defined and secured by the appended claims.

What is claimed is:

1. A tracking servo control system for a disc memory comprising:

at least one disc medium on which a plurality of concentric data tracks are provided for recording and/or reproducing data signals thereon and on which servo sectors are provided for prerecording servo signals;

transducer means for recording and/or reproducing said data signals and for reproducing said servo signals;

actuator means for moving said transducer means in the radial direction of said disc medium;

first detecting means for detecting tracking error in accordance with said servo signals reproduced by said transducer means, said tracking error being representative of the difference between the position of said transducer means and the position of a desired data track to which said transducer means should be positioned;

second detecting means for detecting a current position of said transducer means;

adding means for adding said tracking error from said first detecting means and said current position of said transducer means from said second detecting means;

delay means receiving the added data from said adding means for delaying said added data for a period corresponding to at least one rotation of said disc medium;

comparing means for comparing said current position of said transducer means from said second detecting means with the delayed signal from said delay means; and tracking servo control means for controlling said actuator means in accordance with an output signal from said comparing means, whereby said transducer means is positioned on said desired track.

2. A tracking servo control system for a disc memory according to claim 1, wherein said servo signals comprise first and second servo signals on servo tracks in said servo sectors, which servo tracks are offset from said data tracks in a radial direction of said disc medium by half of the track pitch between said data tracks.

3. A tracking servo control system for a disc memory according to claim 2, wherein said first detecting means comprises:
  envelope detecting means for detecting envelope levels of said first and second servo signals reproduced by said transducer means; and
  second comparing means for comparing said envelope levels of said first and second servo signals.

4. A tracking servo control system for a disc memory according to claim 1, further comprising:
  multiplying means receiving said tracking error from said first detecting means for multiplying said tracking error by a coefficient "a" and supplying the result of multiplication to said adding means so that said adding means adds said result of multiplication and said current position of said transducer means from said second detecting means, said coefficient "a" being selected between 0 and 1.

5. A tracking servo control system for a disc memory according to claim 1, wherein said delay means delays said added data from said adding means for a period corresponding to multiple rotations of said disc medium.

6. A tracking servo control system for a disc memory according to claim 1, wherein said delay means delays said added data from said adding means for a period corresponding to one rotation of said disc medium.

* * * * *